United States Patent
Everett, Jr. et al.

[11] Patent Number: 5,812,267
[45] Date of Patent: Sep. 22, 1998

[54] OPTICALLY BASED POSITION LOCATION SYSTEM FOR AN AUTONOMOUS GUIDED VEHICLE

[75] Inventors: Hobart R. Everett, Jr.; Gary A. Gilbreath; Rebecca S. Inderieden; Theresa T. Tran, all of San Diego, Calif.; John M. Holland, Salem, Va.

[73] Assignee: The United States of America as represented by the Secretary of the Navy, Washington, D.C.

[21] Appl. No.: 677,745

[22] Filed: Jul. 10, 1996

[51] Int. Cl.$^6$ ..................................... G01B 11/14
[52] U.S. Cl. .................. 356/375; 356/141.1; 180/169; 250/206.1
[58] Field of Search ................ 356/375, 141.1; 250/206.1, 225; 381/577, 580, 587; 180/167, 169

[56] References Cited

U.S. PATENT DOCUMENTS

| | | | |
|---|---|---|---|
| 4,703,820 | 11/1987 | Reinaud | 250/206.1 |
| 4,729,660 | 3/1988 | Tsumura et al. | 356/375 |
| 4,769,700 | 9/1988 | Pryor | 356/375 |
| 4,790,402 | 12/1988 | Field et al. | 356/141.1 |
| 4,855,915 | 8/1989 | Dallaire | 180/169 |
| 4,986,663 | 1/1991 | Cecchi et al. | 356/375 |
| 5,020,620 | 6/1991 | Field | 356/141.1 |
| 5,051,906 | 9/1991 | Evans, Jr. et al. | 180/169 |
| 5,202,742 | 4/1993 | Frank et al. | 356/141 |
| 5,255,195 | 10/1993 | Mochizuki et al. | 356/141.1 |

FOREIGN PATENT DOCUMENTS 58-178205  10/1993  Japan ..................................... 356/375

*Primary Examiner*—Frank G. Font
*Assistant Examiner*—Zandra V. Smith
*Attorney, Agent, or Firm*—Harvey Fendelman; Peter A. Lipovsky; Michael A. Kagan

[57] ABSTRACT

An optically based position location system, comprises multiple reflectors positioned at known locations in an environment; a vehicle for traveling along a path in the environment; a first sensor for generating and detecting a collimated and polarized first light signal reflected from one of the reflectors, and for generating a first output signal in response to detecting the first light signal; a second sensor for generating and detecting a collimated and polarized second light signal reflected from the reflector reflecting the first light signal, and for generating a second output signal in response to detecting the second light signal; and a data processor which uses the first and second output signals for determining the distance between a reference coordinate on the vehicle and the reflector.

11 Claims, 2 Drawing Sheets

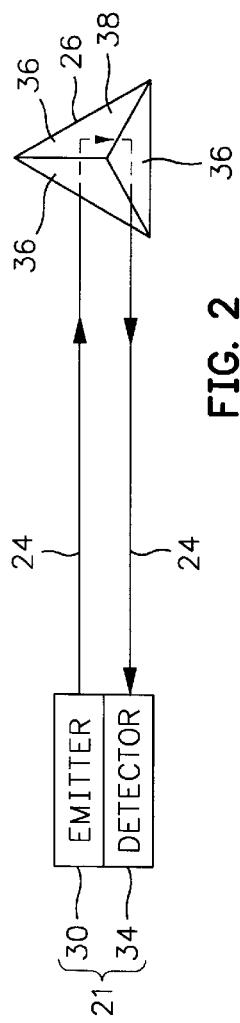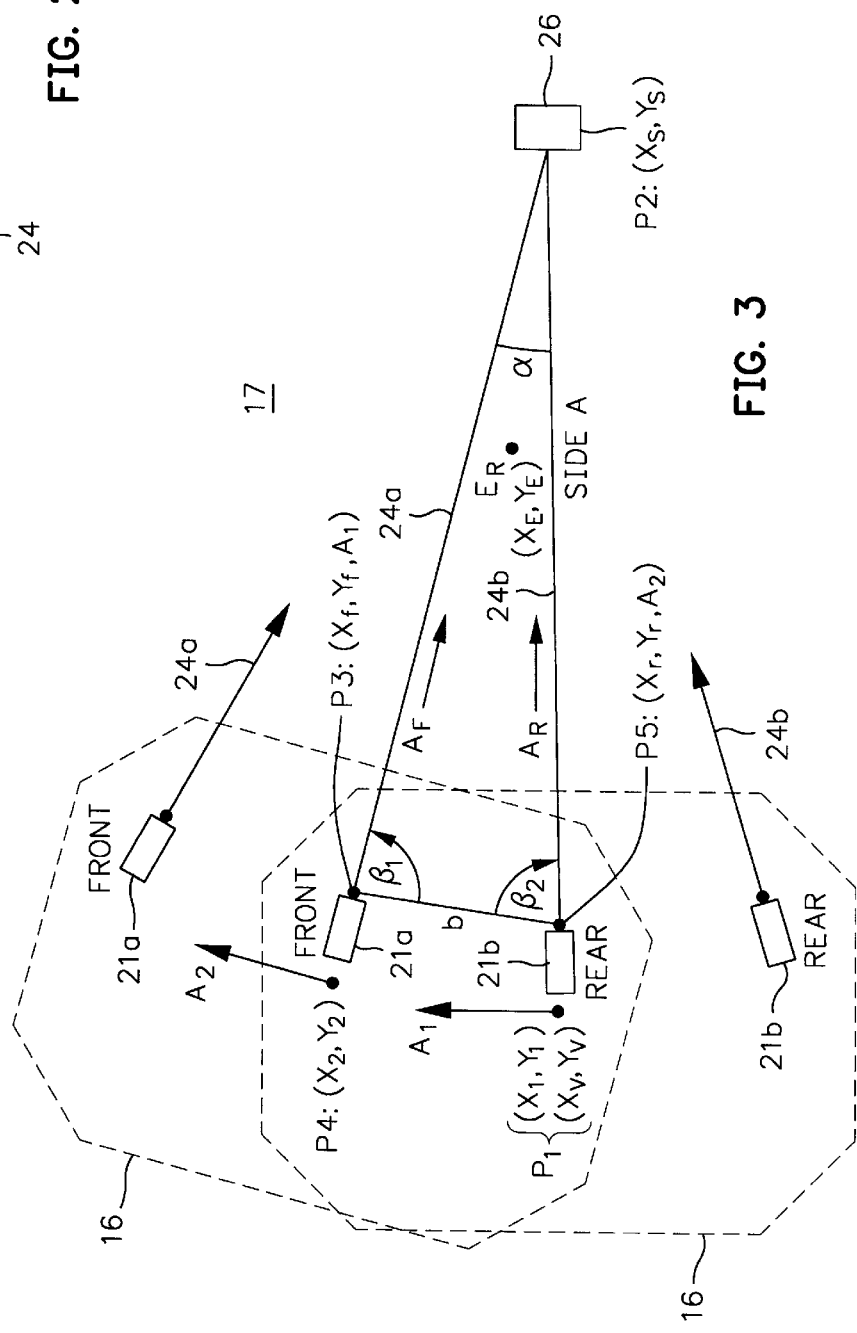
FIG. 2
FIG. 3

OPTICALLY BASED POSITION LOCATION SYSTEM FOR AN AUTONOMOUS GUIDED VEHICLE

BACKGROUND OF THE INVENTION

The present invention relates to the field of navigation systems for autonomous guided vehicles, and more particularly, a navigation system that relies on reflected optical beams for determining the distance and orientation of a vehicle with respect to multiple known reference locations distributed throughout an operating environment in a direction generally transverse to the path of the vehicle.

The biggest technological hurdle impeding the widespread introduction of autonomous mobile vehicles or robots in semi-structured and unstructured environments is accumulated dead-reckoning errors which ultimately confuse the robot navigation system and render it unable to navigate. A multitude of non-contact ranging systems have been proposed for the purpose of continuously determining the mobile vehicle's actual position in absolute coordinates, and resetting the navigational parameters (i.e., X, Y, and heading) to null out accumulated errors, thereby re-referencing the vehicle.

Re-referencing systems can be ultrasonic, RF, or optical in nature, with ultrasonic and optical being the most common for indoor scenarios. Of these latter two categories, optical systems are generally more accurate and therefore more widely employed in commercial practice. Typical embodiments involve some type of scanning mechanism that operates in conjunction with fixed-location references strategically placed at pre-defined surveyed sites. A number of variations on this theme are seen in practice: 1) scanning detectors with fixed active-beacon emitters; 2) scanning emitter/detectors with passive retroreflective targets; 3) scanning emitter/detectors with active transponder targets; and 4) rotating emitters with fixed detector targets.

One type of referencing system employs retroreflective targets distributed throughout the operating area of an automated guided vehicle (AGV) in order to measure range and angular orientation. A servo-controlled rotating mirror on the AGV pans a near-infrared laser beam through a horizontal arc of 90 degrees at a 20-Hz update rate. When the beam sweeps across a target of known dimensions, a return signal of finite duration is sensed by the detector. Since the targets are all the same size, the signal generated by a close target will be of longer duration than that from a distant one. The limiting assumption in this scheme is that the targets remain normal to the beam, which is not always the case. Angle measurement is initiated when the scanner begins its sweep from right to left; with detection of the reflected signal terminating the timing sequence.

Another re-referencing system employs a free-ranging AGV in a materials handling system that relies on a scanning laser triangulation scheme to provide positional updates to the vehicle's onboard dead-reckoning system. The laser rotates at 2 rpm to illuminate passive retroreflective barcode targets affixed to walls or support columns at known locations up to 15 meters away from the vehicle. The barcodes are used to positively identify the reference target and eliminate ambiguities due to false returns from other specular surfaces within the operating area. An onboard computer calculates X-Y positional updates through simple triangulation to null out accumulated dead-reckoning errors. The barcode targets are fairly large and somewhat obtrusive, and are subject to potential damage from passing forktrucks or other vehicle activity.

Another system uses an LED-based navigational referencing system for open-area autonomous platform control. The system calculates vehicle position and heading at ranges up to 80 feet within a quadrilateral area defined by four passive retroreflective beacons. A static 15-second unobstructed view of all four beacons is required for initial acquisition and set-up, after which only two beacons must remain in view as the robot moves about the area. This system cannot accommodate new beacons along a continuous route, so operation is currently constrained to a single zone roughly the size of a small building (i.e., 80 by 80 feet).

Another type of laser-based scanning beacon system computes vehicle position and heading out to 600 feet using cooperative electronic transponders (100 feet with passive reflectors). This is a non-ranging triangulation system with an absolute bearing accuracy of ±0.03 degrees at a scan rate of 600 rpm. The scanner mechanism consists of a rotating mirror attached at a 45-degree angle to the vertical shaft of an incremental optical encoder. In order to achieve increased azimuthal accuracy, a timer interpolates between encoder counts. The fan-shaped beam is spread 4 degrees vertically to ensure target detection at long range while traversing irregular floor surfaces, with horizontal divergence limited to 0.3 milliradians. Each target is uniquely coded, and up to 32 separate targets can be processed in a single scan, with vehicle X-Y position calculated every 100 milliseconds.

A 360-degree field-of-view beacon tracking system of the type discussed above may be used to re-reference the position of an AGV in semi-structured warehouse operations. However, the effectiveness of a multiple-beacon triangulation scheme is to a large extent dependent on the overall field of view, which suggests the ideal scanning system should be located as high as possible with 360-degree coverage. In the case of a security robot, unfortunately, these same criteria likewise influence performance of both the surveillance camera and the intrusion-detection suite. Having three such sensor systems competing for a full-circle view at the very top of the robot introduces some non-trivial design challenges, complicated further still by the fact that video and datalink antennae also work best when situated above all other componentry.

An important consideration for a re-referencing navigation system for an autonomous vehicle is the need for line-of-sight contact with a number of widely distributed beacons. Space is generally a premium in warehouse environments, and as a consequence, vision is often restricted to straight shots up and down long narrow aisles. Surrounding shelving severely limits the effective coverage area for a conventional scanning unit and necessitates use of additional reflective beacons that are positioned so as to be closely spaced down each individual aisle, adding to the cost of an already expensive system. Protruding targets in narrow aisles are vulnerable to fork truck damage, reducing overall reliability while increasing maintenance costs. Thus, much of the flexibility of a 360-degree capability is lost in crowded warehouse applications. A significant disadvantage of existing state of the art systems is the high unit cost, driven by the inherent difficulties associated with deriving range data from a laser based system, and the mechanical and electronic complexities associated with scanning an optical beam. Consequently, few practical applications of this technology exist due to the complexity and disproportional expense of the re-referencing system relative to the cost of the vehicle itself.

Therefore, a need exists for a very low-cost re-referencing navigation system for precisely determining the position of an autonomously guided vehicle that is simple to implement and which would remain effective in a cluttered environment.

SUMMARY OF THE INVENTION

The present invention provides an optically based position location system, comprises multiple reflectors positioned at known locations in an environment; a vehicle for traveling along a path in the environment; a first sensor for generating and detecting a collimated and polarized first light signal reflected from one of the reflectors, and for generating a first output signal in response to detecting the first light signal; a second sensor for generating and detecting a collimated and polarized second light signal reflected from the reflector reflecting the first light signal, and for generating a second output signal in response to detecting the second light signal; and a data processor which uses the first and second output signals for determining the distance between a reference coordinate on the vehicle and the reflector. In another aspect of the invention, the vehicle may include two pairs of sensors. Each of the sensor pairs generates light signals which converge at a point on either side of the vehicle for redundancy.

An important advantage of the invention is that is provides a low-cost re-referencing navigation system for precisely determining the position of an autonomously guided vehicle that is simple to implement and which remains effective in a cluttered environment.

BRIEF DESCRIPTION OF THE DRAWINGS

FIG. 2 illustrates the operation of a retroreflective sensor and retroreflector of the type used in the system shown in FIG. 1.

FIG. 3 geometrically illustrates an application of the invention where the point of convergence of the retroreflective sensors is between the retroreflector and the center of the AGV.

FIGS. 4A, 4B, and 4C collectively illustrate an example of a software routine for determining the position of the vehicle.

Throughout the several views, like elements are referenced using like references.

DESCRIPTION OF THE PREFERRED EMBODIMENT

Figure 1:
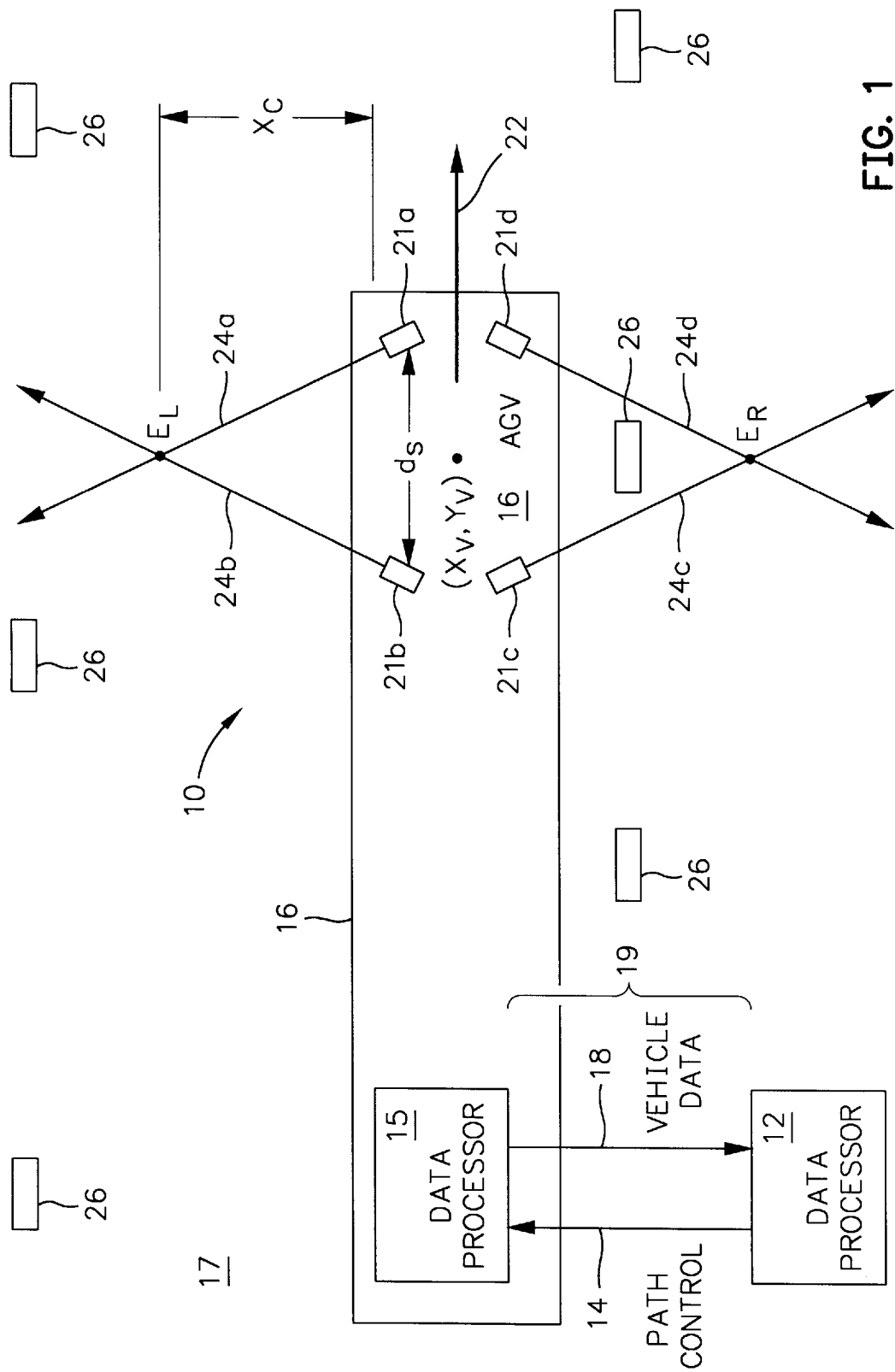
FIG. 1 is a block diagram of the hardware components of an optically based position location system for an autonomous guided vehicle that embodies various features of the present invention.

The purpose of the invention is to provide a low-cost non-scanning optical position location system to continuously re-reference an autonomous guided vehicle with respect to retro-reflective markers located at surveyed sites within an operating environment.

Referring to FIG. 1, there is shown an optically based position location system 10 embodying various features of the present invention that includes a data processor 12, such as an IBM compatible personal computer which provides path execution control signals 14 to an automated guided vehicle (AGV) 16 via an RF communications link 19 to direct the AGV, or vehicle to predetermined locations within an environment 17 based on feedback from vehicle data signals 18 generated by the vehicle, and a navigation processor 15 which provides onboard dead-reckoning solutions and navigation control signals to direct and track the motion of the vehicle along its intended path. An AGV is a vehicle that travels along a path under the supervision of a planning program. An AGV platform suitable for use in conjunction with the invention, may for example, be implemented as a Cybermotion Navmaster Model K2A or Model K3A, or a TRC LabMate. The navigation control signals 14 direct the AGV 16 along a predetermined path within the environment 17 under the supervision of a path planning software routine implemented in the data processor 12. Such path planning software routines are well known. An example of a path planning, or virtual path software routine and an AGV suitable for use in conjunction with the present invention is described in commonly assigned U.S. Pat. No. 5,111,401, "Navigation Control System For An Autonomous Vehicle," incorporated herein by reference. The AGV 16 includes four identical polarized retroreflective sensor units 21a, 21b, 21c, and 21d (collectively referenced as "sensor" or "sensors 21") mounted in pairs (21a, 21b), (21c, 21d) at oblique angles on each side of the AGV 16 from the normal direction of travel represented by vector 22, having a known separation distance $d_s$, symmetrically oriented so their converging beams 24 (collectively referring to beams 24a, 24b, 24c, and 24d) cross at points $E_L$ for beams 24a and 24b and $E_R$ for beams 24c and 24d, a fixed distance $x_c$ (typically 4–5 ft, for example) with respect to a reference coordinate $(x_v, y_v)$ on the AGV 16. The environment 17 includes multiple retroreflectors 26 located at known coordinates throughout the environment 17. The retroreflectors 26 are preferably implemented as vertical strips of 1-inch-wide retroreflective tape such as Banner Model No. BRT-100, that are placed on various immobile objects such as structural-support posts within the environment 17 on either side of a virtual path segment which the AGV is to traverse. The exact X-Y locations of the retroreflectors 26 are encoded into the virtual path software routine that is implemented in the data processor 12. Installation of the retroreflectors 26 requires only seconds each, and if implemented as flat tape, they do not protrude into any aisle ways that may be present in the environment 17. Thus, the retroreflectors 26 are subject to very little risk of damage, as for example, from a passing fork truck.

The lateral and longitudinal positions of the AGV 16 with respect to the retroreflectors 26 may be determined with great accuracy, as for example, ±0.25 inches within the environment using the Law of Sines as the basis for a series of algorithms implemented in a suitable software program. The "lateral position" refers to the distance between a reference coordinate on the AGV 16, such as $(x_v, y_v)$ and a retroreflector 26 in a direction generally transverse to the direction of travel of the AGV 16 along heading 22. Similarly, the "longitudinal position" of the vehicle is that component parallel to the direction of the vehicle path.

As shown in FIG. 2, the retroreflective sensors 21a and 21b each have an emitter 30 which generates a polarized, collimated light signal 24, and an optical detector 34 for detecting the beam or light signal 24 after it reflects off one of the retroreflectors 26. The retroreflectors 26 are preferably corner-cube type retroreflectors having three mutually perpendicular reflective surfaces 36 and a hypotenuse face 38. In operation, when the retroreflective sensor and retroreflector 26 are optically aligned, a polarized light signal 24 generated by the emitter 30 enters the hypotenuse face 38 and then is reflected by each of the surfaces 36 and returned back through the face 38 to the detector 34. An important advantage provided by the retroreflective sensors 21 and retroreflectors 26 is that the polarized retroreflective sensors respond only to polarized light reflected from a retroreflector while ignoring other light reflected from even highly specular surrounding surfaces. The polarized retroreflective sensors 21 may be implemented as LED-based sensors such as Banner Model Q85VR3LP series retroreflective sensors, or alternatively, as more powerful laser-based sensors such as Banner Model Q45BB6LL series sensors for increased range capability. The retroreflectors 26 may be implemented as Banner Model BRT100 Retroreflective Tape.

An understanding of the geometrical basis by which application of the Law of Sines to determine the position of the AGV 16 within the environment 17 is facilitated by the following description taken in conjunction with FIG. 3. In FIG. 3, there is shown AGV 16 on which retroreflective sensors 21a and 21b (only two are shown and described with reference to FIG. 3, although the AGV 16 may include two opposed pairs of retroreflective sensors 21) are mounted as described above. The AGV is shown at an instant in time traveling in a direction having a bearing A1 where the center of the AGV 16 has a relative coordinate $(x_v, y_v)$ coincident with the absolute coordinate $(x_1, y_1)$ at point $P_1$. The coordinate $(x_v, y_v)$ is a relative coordinate because it refers to a particular location on the AGV 16 which may travel throughout the environment 17. The coordinate $(x_1, y_1)$ is referred to as an absolute coordinate because it refers to a particular point in a Cartesian coordinate system referenced to the environment 17. In one type of case in the application of the invention, the front retroreflective sensor 21a detects a reflection off a retroreflector 26 before the rear sensor 21b detects a reflection off a retroreflector 26 because point $E_R$ at relative coordinate $(x_E, y_E)$ at the point of convergence of the light signals 24a and 24b lies between the retroreflector 26 and the reference coordinate $(x_v, y_v)$ on the AGV 16.

In FIG. 3, AGV 16 is shown to have a relative coordinate selected to be, for example, at the center of the AGV at coordinate $(x_v, y_v)$ at a first instant in time, $t_0$, where $(x_v, y_v)$ is coincident with fixed coordinate $(x_1, y_1)$. AGV 16 travels along heading $A_1$ to a second position at time, $t_1$, over the interval $(t_1-t_0)$ whereupon $(x_v, y_v)$ is coincident with absolute coordinate $(x_2, y_2)$. The retroreflector 26 has the coordinates $(x_s, y_s)$ at point $P_2$, where the distance between $(x_v, y_v)$ and $(x_E, y_E)$ is less than the distance between $(x_v, y_v)$ and the retroreflector at coordinate $(x_s, y_s)$. In such case, as the AGV 16 travels along bearing $A_1$ so that coordinate $(x_v, y_v)$ next is coincident with coordinate $(x_1, y_1)$, the front retroreflective sensor 21a generates a light signal 24a at coordinate $(x_f, y_f)$ at point $P_3$ along bearing $A_F$ that is reflected from the retroreflector 26 at coordinate $(x_s, y_s)$ and detected by the sensor 21a. Then, AGV 16 continues along its path in the direction of bearing $A_2$ so that when coordinate $(x_v, y_v)$ is coincident with coordinate $(x_2, Y_2)$ at point $P_4$, the rear retroreflective sensor 21b generates a light signal 24b at coordinate $(x_r, Y_r)$ at point $P_5$ along bearing $A_r$ that is reflected from the retroreflector 26 at coordinate $(x_s, y_s)$ and detected by the sensor 21b. Since the baseline distance $\overline{P_3P_5}$ between the sensors 21a and 21b is determined by the dead reckoning software from vehicle data provided to data processor 15, and the positions of the sensors 21a and 21b, and their orientation bearings $(A_F$, and $A_R)$, respectively, all are known with respect to the reference position $(x_v, y_v)$, the Law of Sines may be used to determine the distance $\overline{P_4P_2}$ between the retroreflector 26 and the most recent AGV reference coordinate $(x_v, y_v)$. $\overline{P_3P_5}$ represents the distance between the location where the first sensor detects the corresponding retroreflective beam 24 and the location where the second sensor detects the corresponding retroreflective beam 24.

A position location software (PLS) routine 200 by which the position of the AGV 16 is determined (from dead reckoning) may be written, for example, in C++ programming language or any other suitable language, and implemented on a data processor 15 which, for example, may be an IBM compatible personal computer. The PLS software may also be written in assembly language and implemented on a Z-80 microprocessor, as for example, on the Cybermotion Model K2A Navmaster vehicle.

Referring to FIGS. 4a–4c, the position location software routine 200 begins at step 204 and proceeds to step 206 where constant values are assigned for the following characteristics for each of retroreflective sensors 21a, 21b, 21c, and 2d (also collectively referenced as sensors 21): BEAM_ANGLE, representing the relative mounting angle of the sensors 21 to the vehicle heading 22; LOC_ANGLE, representing the relative angle from $(x_v, y_v)$ to the lens face of the sensors 21; and LOC_DIST, representing the relative distance to the lens face of the sensors 21 from the reference coordinate $(x_v, y_v)$ of the vehicle. Then, at step 208, the following variables are initialized for each of retroreflective sensors 21 to have values of zero: BEAM_AZ, representing the beam angle to the retroreflective sensor in the vehicle coordinate frame when a retroreflector is detected; BEAM_X, representing the X coordinate of the lens face of the sensor 21 when the retroreflector 26 is detected; and BEAM_Y, representing the Y coordinate of the lens of the sensor 21 when the retroreflector 26 is detected.

At step 212, a determination is made as to whether or not one or more of the sensors 21 have detected a retroreflected light signal, i.e., a light signal resulting from reflection of light signals 24a, 24b, 24c, and/or 24d (also collectively referenced as light signals 24). If the determination at step 210 is NO, the routine loops back to step 210. If the determination at step 210 is YES, the routine 200 proceeds to step 212 whereby sensor trigger information for each of the sensors 21 is stored in a four-bit word. Such information for each sensor may be stored as a logical "1" or "0" for each bit, where "1" represents that a particular sensor 21 has detected a retroreflected signal 24, and a "0" indicates that the sensor has not detected a retroreflected signal 24. By way of example, the first bit may represent the status of the left rear sensor 21b, the second bit may represent the status of the left front sensor 21a, the third bit may represent the status of the right rear sensor 21c, and the fourth bit may represent the right front sensor 21d.

At step 214, a determination is made as to whether the estimated dead-reckoning position of the AGV 16 is valid. If the determination at step 214 is NO, the routine loops back to step 210. If the determination at step 214 is YES, an index is initialized at step 216, where each index value represents the set of data stored for a particular sensor 21. For example, index "0" may represent the right-front sensor data. Next, at step 218, the index initialized at step 216 is incremented for all sets of sensor data, and is also used as the index for the BEAM_ANGLE, LOC_ANGLE, and LOC_DIST data arrays. At step 220, a determination is made as to whether a particular sensor 21 has detected a retroreflection from one of the light signals 24. If the determination at step 220 is NO, the routine 200 proceeds to step 222 which determines if any other sensors have detected a retroreflected light signal 24. If the determination at step 222 is YES, the program returns to step 218 to process the data for the next sensor 21. If the determination at step 222 is NO, the program returns to step 210.

If the determination at step 220 is YES, the program calculates and stores beam data BEAM_AZ for the current sensor, representing the angle from coordinate $(x_v, y_v)$ to the retroreflector 26 in the vehicle coordinate frame, BEAM_X, representing the X coordinate of the sensor 21 lens face in the vehicle coordinate frame, and BEAM_Y, representing the Y coordinate of the sensor 21 lens face in the vehicle coordinate frame, where:

BEAM_AZ=EST_AZ+BEAM_ANGLE, where EST_AZ represents the current estimated dead-reckoning heading provided by the virtual path program by an interrupt routine to program 200;

BEAM_X=EST_X+LOC_DIST•SIN (LOC_ANGLE+EST_AZ), where EST_X represents the estimated X coordinate of the point $(x_v, y_v)$, for example, at the center of the AGV 16, provided by the virtual path program; LOC_DIST represents the distance between the point $(x_v, y_v)$ and the location of the face of a particular sensor 21, and EST_AZ represents the current vehicle heading determined by dead reckoning, as previously calculated; LOC_ANGLE represents the angle defined by a line segment extending from point $(x_v, y_v)$ to the coordinates of a particular sensor 21 and the current vehicle (AGV 16) heading; and EST_AZ represents the dead-reckoning heading of the AGV 16 calculated by the virtual path software program; and

BEAM_Y=EST_Y+LOC_DIST•COS (LOC_ANGLE+EST_AZ), where EST_Y represents the estimated Y coordinate of the point $(x_v, y_v)$. Lastly, BEAM1PT is set to point to the data for the current, or most recent beam 24.

At step 226, a determination is made as to whether or not any of the sensors 21 is on the same side, i.e., (21a and 21b), or (21c and 21d), on the AGV 16 previously detected a retroreflective beam 24. If the determination at step 226 is NO, the routine 200 proceeds to step 228 where BEAM2PT is set equal to the current BEAM1PT. BEAM2PT always points to the older beam data and BEAM1PT always points to the current (most recent) beam data. If the determination at step 226 is YES, then at step 230, the base length (BASE_LEN) and base azimuth (BASE_AZ) are determined as follows:

BASE_AZ=tan⁻¹[FIG], where

F=BEAM1PT.BEAM_X−BEAM2PT.BEAM_X; and

G=BEAM1PT.BEAM_Y−BEAM2PT.BEAM_Y; and where BASE_AZ represents the angle between the coordinates $(x_1, y_1)$ and $(x_2, y_2)$;

BEAM1PT.BEAM_X represents the most recent X coordinate of the lens face of the sensor 21 at the time it detected the beam 24;

BEAM2PT.BEAM_X represents the penultimate X coordinate of the lens face of the sensor 21 at the time it detected the beam 24;

BEAM1PT.BEAM_Y represents the most recent Y coordinate of the lens face of the sensor 21 at the time it detected the beam 24; and BEAM2PT.BEAM_Y represents the penultimate Y coordinate of the lens face of the sensor 21 at the time it detected the beam 24.

At step 232, a determination is made as to whether the base length, BASE_LEN is greater than a predetermined limit, as for example 8 feet. If the determination at step 232 is YES, then the data pointed to by BEAM2PT is erased to indicate that only one of the sensors 21 provided valid data. Continuing from step 234, the routine 200 proceeds to step 218. If, however, the determination at step 232 is NO, then at step 236, the values for ∠A, ∠B, and ∠C are determined. ∠A represents the angle between the baseline from points $(x_r, y_r)$ to $(x_f, y_f)$ and the older beam (BEAM2PT). ∠B represents the angle between the baseline from points $(x_r, y_r)$ to $(x_f, y_f)$ and the most recent beam, BEAM1PT. ∠C is determined as follows:

$$\angle C = 180° - \angle A - \angle B; \text{ where:}$$

∠A=BEAM2PT.BEAM_AZ−BASE_AZ; and

∠B=BEAM2PT.BEAM_AZ−BASE_AZ.

[It is to be noted that BEAM_AZ and BASE_AZ have been defined above.]

Next, at step 238, the length of SIDE_A is calculated, where SIDE_A=BASE_LEN•sin (∠A)/sin (∠C). After step 238, the position of the retroreflector 26 from which the light signals 24 were reflected is calculated as follows:

STRIPE_X=BEAM1PT.BEAM_X+SIDE_A•sin (BEAM1PT.BEAM_AZ);

STRIPE_Y=BEAM1PT.BEAM_Y+SIDE_A•sin (BEAM1PT.BEAM_AZ).

It is to be noted that as previously described, BEAM1PT is a pointer.

A determination is made at step 242 as to whether the current estimated AGV position is valid. A valid position is based on predetermined criteria such as the rate of turn of the AGV 16. For example, if the rate of turn is less than some limit, the position of the AGV is considered valid; or if the rate of turn exceeds some limit, there would be too much uncertainty in the estimated position of the AGV and the position is considered invalid. If the result of the determination at step 242 is NO, the routine continues to step 210. If the result of the determination at step 242 is YES, then the routine 200 continues to step 244 where the results of step 240 are set as valid. Then at step 246, a determination is made as to whether the retroreflector from which the light signals 24 reflected is on the starboard side of the AGV 16. If the determination at step 246 is NO, then the left coordinates of the retroreflector 26 are set equal to those calculated at step 240 and the routine 200 returns to step 210. If, however, the determination at step 246 is YES, the right coordinates of the retroreflector 26 from which the light signals 24a and 24b, or 24c and 24d, reflect, are set equal to the X and Y coordinates determined at step 240. These coordinates (either left or right) can then be used by the control software for the AGV 16 to correct the vehicle position.

Obviously, many modifications and variations of the present invention are possible in the light of the above teachings. It is therefore to be understood that within the scope of the appended claims, the invention may be practiced otherwise than as specifically described.

We claim:

1. An optically based position location systems comprising:

multiple reflectors positioned at known locations in an environment;

a vehicle for traveling along a path in said environment;

a first sensor for generating and detecting a collimated and polarized first light signal reflected from one of said reflectors, and for generating a first output signal in response to detecting said first light signal, a second sensor for generating and detecting a collimated and polarized second light signal reflected from said one reflector, and for generating a second output signal in response to detecting said second light signal where said first and second sensors are mounted on said vehicle so that said first and second light signals converge and a first data processor for determining the distance between a reference coordinate on said vehicle and said one reflector based on said first and second output signals.

2. The optically based location system of claim 1 in which said first and second light signals converge at a point which is at a fixed distance from said reference coordinate.

3. The optically based location system of claim 1 in which said vehicle travels in a path supervised by a second data processor which provides path planning control signals to said first data processor.

4. The optically based location system of claim 3 in which said first data processor is mounted to said vehicle.

5. The optically based position location system of claim 1 in which said reflectors are retroreflectors.

6. An optically based position location system, comprising:

multiple reflectors positioned at known locations in an environment;

a vehicle for traveling along a path in said environment;

a first sensor for generating and detecting a collimated and polarized first light signal reflected from one of said reflectors, and for generating a first output signal in response to detecting said first light signal;

a second sensor for generating and detecting a collimated and polarized second light signal reflected from said reflector reflecting said first light signal, and for generating a second output signal in response to detecting said second light signal;

a third sensor for generating and detecting a collimated and polarized third light signal reflected from one of said reflectors, and for generating a third output signal in response to detecting said first light signal;

a fourth sensor for generating and detecting a collimated and polarized fourth light signal reflected from said reflector reflecting said third light signal, and for generating a fourth output signal in response to detecting said fourth light signal;

a first data processor for determining the distance between a reference coordinate on said vehicle and said reflector reflecting either said first and second light signals or said second and third light signals, from said first, second, third, and fourth output signals.

7. The optically based position location system of claim 6 in which said reflectors are retroreflectors.

8. The optically based location system of claim 6 in which said first and second sensors are mounted on said vehicle so that said first and second light signals converge.

9. The optically based location system of claim 8 in which said first and second light signals converge at a point which is at a fixed distance from said reference coordinate.

10. The optically based location system of claim 8 in which said vehicle travels in a path supervised by a second data processor which provides path planning control signals to said first data processor.

11. The optically based location system of claim 8 in which said first data processor is mounted to said vehicle.

* * * * *